United States Patent [19]

Campanelli et al.

[11] Patent Number: 4,928,424
[45] Date of Patent: May 29, 1990

[54] FLOWER STEM CUTTER

[75] Inventors: Anthony S. Campanelli; Daniel A. Matré, both of Milwaukee, Wis.

[73] Assignee: Rosestar* Incorporated, Milwaukee, Wis.

[21] Appl. No.: 217,943

[22] Filed: Jul. 12, 1988

[51] Int. Cl.⁵ .............................................. A01G 3/00
[52] U.S. Cl. ...................................... 47/1.01; 30/124; 30/280; 30/282; 30/286; 83/167; 83/545; 99/637
[58] Field of Search ................... 30/113, 278, 280, 282, 30/335, 241, 123.3, 286, 124; 83/167, 545; 47/1 R, 6, 7, 1.01; 99/637

[56] References Cited

U.S. PATENT DOCUMENTS

| | | | |
|---|---|---|---|
| 1,136,182 | 4/1915 | Swift | 30/113 |
| 3,911,577 | 10/1975 | Nickel | 30/278 X |
| 4,348,832 | 9/1982 | Hauser | 30/123.3 X |
| 4,509,260 | 4/1985 | Gringer | 30/335 X |

Primary Examiner—Frank T. Yost
Assistant Examiner—Rinaldi Rada
Attorney, Agent, or Firm—Andrus, Sceales, Starke & Sawall

[57] ABSTRACT

A flower stem cutter unit includes a small decanter sufficient to cover the lower end of a flower stem projecting into the decanter. A guillotine blade unit is secured to a cover and projects into the decanter. A guide wall projects inwardly from a cover opening and terminates in a vertical fixed blade support wall having a flat cutting blade secured thereto. The wall and blade have an opening to receive the stem. The movable blade unit has a supporting stem extending through said cover and an integral vertical blade support abutting said fixed blade. A guillotine blade is fixed to the inner face of the vertical blade support to form the integrated unit. The blade and is secured in angular relationship to the fixed blade and moves progressively over the cutting edge of the fixed blade. A finger gripping tab projects outwardly from the movable blade support for periodic replacement of the movable blade unit. A removable guard unit is releasably secured to the fixed blade support and is located in outwardly spaced relation to the fixed blade and the movable blade of the unit. The guard unit includes a bottom lip projecting toward the support to enclose the blade unit. The lip also locates the stem end for cutting.

15 Claims, 2 Drawing Sheets

FLOWER STEM CUTTER

BACKGROUND OF THE PRESENT INVENTION

The present invention relates to a flower stem cutting apparatus and particularly to such an apparatus for cutting of a flower stem immediately prior to introduction into a display vase or the like.

In the distribution of natural cut flowers, the flower stems are preferably severed under water and maintained in a moist condition. The life of the cut flower is significantly extended in this manner.

Various publications have recognized the desirability of cutting a flower stem underwater.

For example, the effectiveness of underwater cutting of flowers is discussed in some detail in an article entitled "Recut Rose Stems Underwater To Extend Vase Life" by H. Paul Rasmussen in the Florist's Review of June 14, 1979.

Generally, the flower stem is the life support system for the plant including tubular portion which acts as a conduit for transfer of water to the flower and leaves of a flower. The stem also acts as a conduit for transmission sugar and like components. The water conduits act much like a straw. As long as the conduit is filled with water, it will continue to draw water upwardly. If however, the stem is cut in an air environment, an air bubble can form on the cut end of the conduit and essentially terminate the syphoning movement of water. Further, in the plant, the sugar component moves downwardly through the stem to the root system. When the stem is cut from the plant, the sugar continues to flow for a short period. The sugar can move across the cut surface and move into an open water conduit, where the sugar can cystallize and plug the conduit, again interfering with the natural and desired flow within the flower structure. The latter is particularly possible if air has been drawn into the passageway. Severing of the stem under water and maintaining the stem essentially underwater eliminates all the problems associated with air cutting of the stems. This article and others describe the above phenomena as well as others which are known to occur with underwater cutting of flower stems. A faster and more complete hydration of the flower, as well as improved movement of the water and water-borne preservatives. The improved action may revive wilted flowers including roses with "bent necks", enhance flower performances providing a larger more vibrant flower, and increase the opening rate of flowers such as "BVD-cut" carnations.

In commercial applications, various mechanized systems have been devised for severing the stems of a substantial number of assembled flowers. Flowers as marketed by the retail stores and the ultimate purchaser, who often place the flowers on display, can also prolong the life of the flower by severing the flower stem under water just prior to placing in a water filled display vase or other support. A particularly small, portable unit for use by the ultimate consumer is disclosed in U.S. Pat. No. 4,348,832 which issued to Allan H. Hauser on Sep. 14, 1982 and is entitled "Single Flower Stem Cutter". As more fully disclosed in such patent, a small portable jar is provided having a releasable cover. A guillotine blade unit is secured within the cover and provides a guillotine cutting mechanism immersed with a liquid solution within the jar. The top cover includes an opening with an inclined guide wall for moving of one or a limited number of stems into the solution and through the cutting mechanism. When in place, the user may, conveniently, actuate the guillotine blade unit to provide a smooth, finished severing of the flower stem or stems. The guillotine blade is readily manually operated or, as disclosed may be provided with some form of a power operator.

The small portable unit in the above patent provides a particularly effective means for use in the home, office or the like where one or just a few flower stems are to be cut.

Although the structure of the Hauser patent provides a very convenient means for effective cutting of the stem, it generally provides for severing of an excessive amount of the stem structure. Further, the movable blade is a flat blade with its plane of movement essentially in the plane adjacent to the flat cutting fixed blade. The blade structures particularly with time may provide for slight spacement between the fixed blade and the movable blade. Even the slightest gap between the blade structure may result in a less than optimum severing of the stem. Further, the movable blade structure is shown removably mounted to the cutter for purposes of permitting replacement. This is of course highly desirable as the use of a sharp blade significantly contributes to the optimum severing of the flower stem as a result of a true guillotine action, particularly where the blade is mounted to effect a close sliding engagement with the fixed blade. However, the blade which is preferably formed with an extremely sharp cutting edge much in the nature of a razor blade. The sharp blade thus presents a potential hazard requiring significant care in the replacement of the blade.

Further, the blade structure is somewhat exposed in the assembled position and particularly if disassembled. The sharp blade structure presents a possible hazard condition. Additionally, the stem is located by movement into the jar past the cutting mechanism and may project inwardly at various lengths depending on the jar structure. Often, it is desired to only remove a limited tip portion of the flower stem, such as ½ to 1 inch. In addition, the method of mounting the movable blade and fixed blade are not particularly adapted to mass production and a long extended life.

There is therefore a need for an improved portable flower stem cutter which can provide optimum cutting efficiency with proper location of the flower stems and providing minimum hazardous conditions curing disassembly of the flower stem cutter apparatus or the like. Further, the movable blade should be readily and safely replaced to maintain optimum cutting of the flower stem.

SUMMARY OF THE PRESENT INVENTION

The present invention is particularly directed to an improved flower stem cutter of a small portable variety for use by the end user and incorporates a guillotine blade structure. Generally, in accordance with the present invention, the guillotine movable blade assembly or unit is formed with an integrated, protective encircling guard unit which in an optimum construction, includes a stop unit to appropriately locate the flower stem with respect to the guillotine blade assembly.

In a particularly practical construction, the guard including an outer flat wall is generally aligned with the fixed blade unit. The bottom wall is an inclined lip which projects inwardly toward the blade support and terminates in slightly spaced relation to the support.

The guard includes sidewalls secured to the flat wall and extending outwardly and inwardly to an integral connection to the fixed blade support. The movable blade unit is located abutting the fixed blade within the guard. The guard encloses the movable blade unit during the total cutting operation. The guard is preferably releasably fixed to the fixed blade support and when removed establishes access to the movable blade unit for periodic replacement of the blade unit. This permits the continued sharp severing of flower stems.

The cover or cap is a generally cup-shaped member having a rim releasably secured to the top of the container. The cover includes a diametric tubular slot which projects inwardly from one side of the cover across about one-half the diameter of the cover and the container, with a guide wall projecting inwardly and downwardly into the container. The guide wall terminates in a vertical blade support wall having a flat cutting blade secured thereto. The support wall and blade includes an opening generally aligned with each other and the opening of the tubular guide. The lower edge of said fixed blade opening defining a flat cutting surface. The movable blade unit has a supporting plunger or stem extending through said cover and having a vertical blade support, shown as a flat plate, abutting the fixed blade. A guillotine blade is fixedly secured to the inner face of the vertical blade support to form an integrated assembly and is secured in angular relationship thereto to move progressively over the cutting edge of the fixed blade. In an optimum structure, the blade and the support are formed as a single integrated blade unit having a projecting finger gripping portion for insertion and removal of the integrated blade unit.

More particularly, in a preferred construction of the flower stem cutting apparatus, a hand-held portable container includes a protective liquid solution sufficient to cover the lower end of a flower stem projecting into the container and through a fixed guillotine blade unit secured to the container. The support structure for the guillotine blade unit is secured to a container cover and projects into the container. A guard unit is releasably secured to the support and is located in outwardly spaced relation to the fixed blade of the unit. The guard unit overlies the fixed blade unit and includes the bottom wall portion projecting laterally toward the blade support unit to maintain a significant enclosure about said fixed blade and a movable blade unit. The bottom wall of the guard also serves as a stop to locate the stem end in close spaced relation to the cutting blades.

Further, interruption of the fluid passageways generally is limited to less than one inch of the lower inch of the stem. Thus, it is only necessary to remove the lower most portion of the stem to obtain the benefit of establishing and maintaining effective flow passageways with the stem structure. The bottom guard wall properly locates the stem.

The movable blade unit includes a stem journaled in the cover and blade plate integral with the stem. The plate has an offset angled abutment to receive and locate the flat blade for movement past the fixed blade. A finger ledge projects laterally of the plate and stem for insertion and removable of the removable blade unit.

The present invention provides a significant improvement in the small compact flower stem cutters adapted for use by the end purchaser of the flowers and particularly for domestic and on-site cutting of a limited length of one or more flower stems in a quick, efficient and effective manner. The blade unit is safely and reliably replaced after numerous usages to maintain a highly effective flower stem cutter.

DESCRIPTION OF THE DRAWINGS

The drawings furnished herewith generally illustrate a preferred construction of the present invention in which the above advantages and the features are clearly disclosed as well as others which will be readily understood from the following description of the drawings and the invention.

In The drawings.

DESCRIPTION OF THE ILLUSTRATED EMBODIMENT

Figure 1:
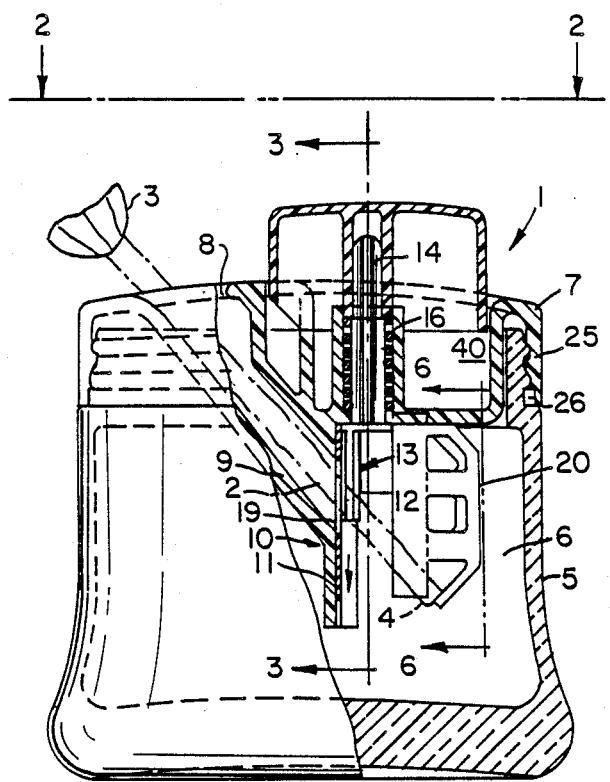
FIG. 1 is a side elevational view of an embodiment of the invention with parts broken away and sectioned to most clearly show the certain detail of construction.
Figure 2:
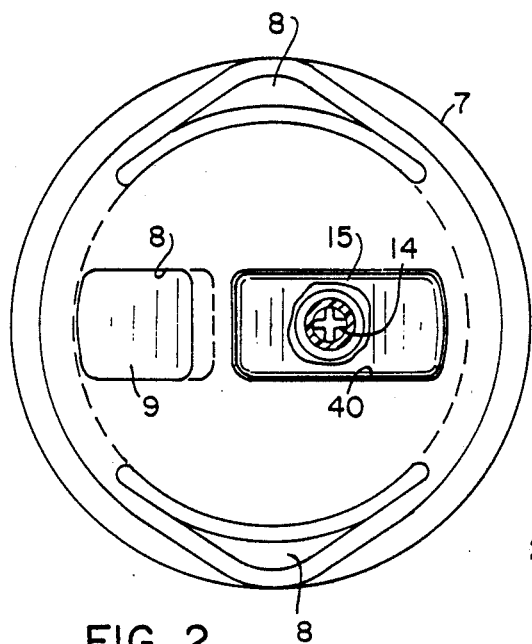
FIG. 2 a plan view of FIG. 1.
Figure 3:
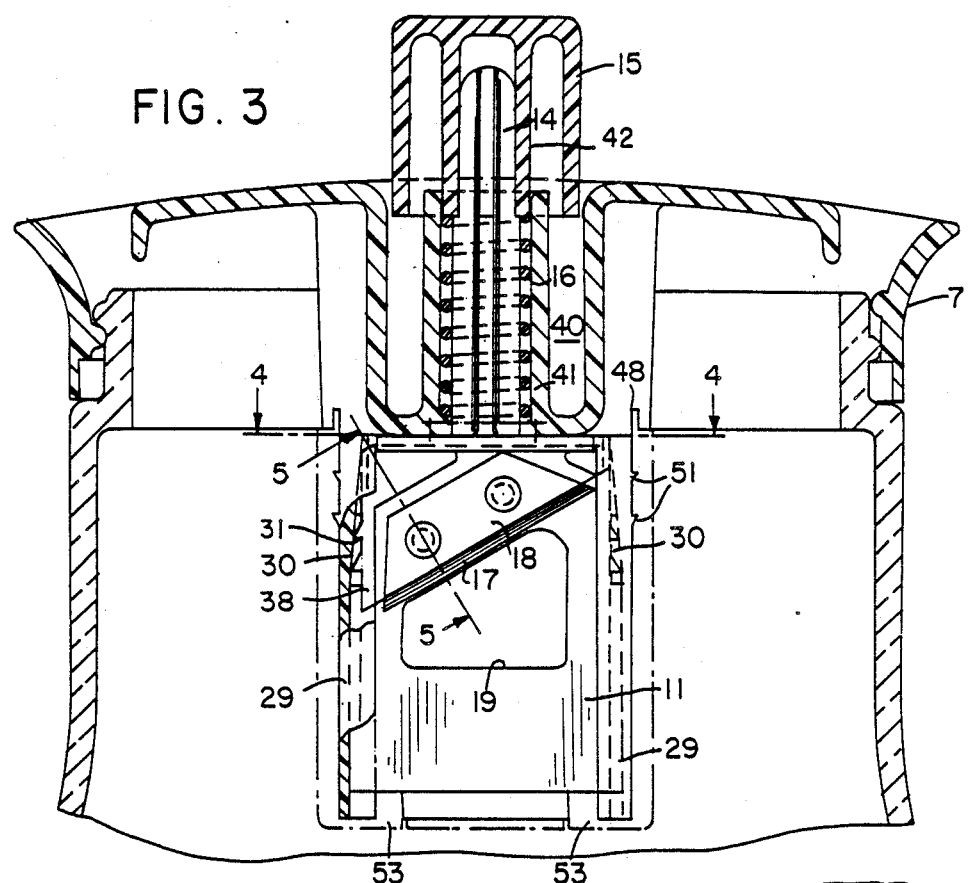
FIG. 3 enlarged fragmentary vertical section through the flower stem cutter taken generally on line 3—3 of FIG. 1.

Referring to the drawings and particularly to FIGS. 1-3, an improved flower stem cutter 1 illustrating an embodiment of the present invention is shown with the stem 2 of a fresh cut flower 3 supported within the flower cutter for removing the terminal end 4 of the flower stem. The illustrated flower stem cutter 1 basically follows the general arrangement and teaching of the previously identified U.S. Pat. No. 4,348,832 and includes a small container or jar 5 which is filled with water 6, or other suitable liquid, to a substantial depth such as two-thirds of the total depth of the jar. The illustrated jar 5 specifically includes a slightly enlarged base smoothly merging with the sidewall to provide maximum stablizing and while supporting a significant number of flower stems, and containing the cut ends with the jar 5.

As most clearly shown in FIG. 3, the top cap structure is also provided with lateral funnel-like openings for convenient introduction of the water or other additives into the jar with the cover in place. The openings also permit the pouring of the liquid from within the cutting jar into a vase or the like, not shown, without the cut stems passing from the jar.

The flared portions of the cap with the generally V-shaped openings particularly provide for convenient pouring of liquid from the jar or decanter into a flower vase or the like. The inclined and tapered opening further significantly avoids any movement of the flower stems from within the jar into the vase or otherwise. The cap is preferably molded from a high-impact durable polystrene in the illustrated functional, modern design.

A cover 7 is releasably attached to the upper end of the jar and includes an opening or slot 8 to one side of the cover. A flower guide member 9 projects inwardly from the cover opening 8 for directing of the flower stem 2 extending angularly across the jar and with the lower end of the stem submerged substantially within a body of water. 6. A guillotine cutter unit 10 is secured within the jar 5. In accordance with the present invention the cutting unit 10 includes a special fixed cutting blade 11, preferably formed of stainless steel, secured to the innermost end of the guide member 9 and a guillotine blade unit 12 supported on a movable support 13 for manual positioning and movement past the fixed blade 11. The movable support 13 includes a shaft 14 which projects upwardly through the cover and is secured to an operating cap 15 to the exterior of the cover 7. A spring 16 urges the movable support 13 upwardly to raise the guillotine blade unit 12 upwardly and with a lower cutting edge 17 of a movable blade 18 spaced upwardly of a cutting edge 19 of the fixed blade 11. In accordance with the teaching of the present invention, a special guard element 20 is releasably secured to the cover 7 and projects from the inner surface of the cover 7 downwardly in laterally spaced relation to the fixed blade 11 and the movable blade support 13. The guard element 20 project downwardly to the lower end of the fixed blade 11 and generally in alignment with the lower end of the fixed blade 11 to cover the cutting mechanism as such. The illustrated guide element 20 includes a inwardly projecting lip 21 which extends inwardly generally normal to the path of the stem guide in the cover 7 and the movable blade. The lip 21 defines a stop wall against which the lower end of the stem 2 is located during the cutting operation. The lip is located to establish removal of about one inch of the flower stem. The guard element 20 further includes a sidewall structure, as more fully discussed hereinafter, which project laterally from that cover to the fixed blade support, and provides an essential enclosure about the blade mechanism and minimizes any danger associated when the cover is removed. The guillotine movable blade is specially formed with sharp cutting edge which combines with the support surface in the fixed blade to form a shearing action in cutting of the flower stems 2. Although the user can be and is warned about the sharp blades and the danger of being cut if the cutting edges are engaged, the guard element, particularly in the illustrated embodiment of the present invention, minimizes the possible accidental harm and further provides appropriate and accurate location of the flower stem 2 with respect to the cutting blades.

More particularly in the preferred illustrated embodiment of the invention, the top cover or cap 7 is formed of a significant depth as a cup-shaped member having an outer peripheral rim 25 adapted to be threadedly secured to the top end of a correspondingly threaded jar 5. As most clearly shown in FIGS. 1 and 3, the cover 7 projects upwardly of the jar in the totally assembled position. The jar 5 is preferably formed with a slightly recessed neck portion defining in a stop ledge 26 against which the inner edge of the cover abuts in the totally assembled location. The upper end of the cover 7 is provided with a slight crown configuration with side flared portion 27 within which the openings for liquid transfer is provided.

The stem inlet opening 8 is formed as a small generally triangular portion to the one side of the cover 7. The stem guide is inclined stem support wall projecting downwardly and inwardly. The lower end of the inclined wall 9 terminates in a connection with a vertical blade support wall 27. The vertical blade support wall 27 is located within the jar generally extending from the above upper water level downwardly and terminating in spaced relation to the bottom of the jar 5. The support wall 27 has an opening 28 with the bottom edge aligned with and integral with stem guide 9. The fixed cutting blade 11 is fixed to the support wall.

Figure 5:
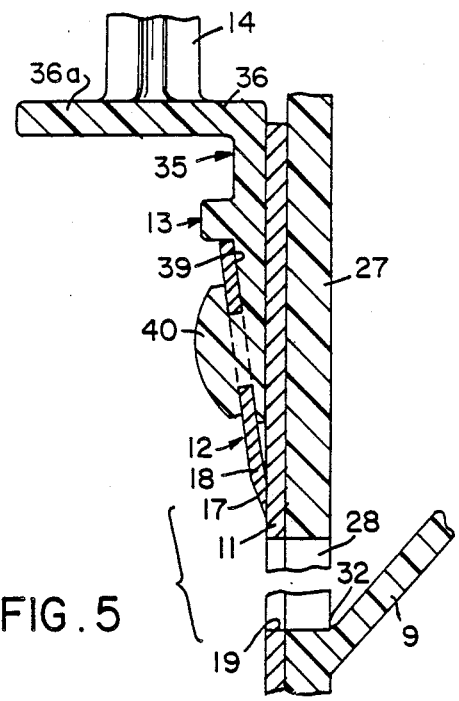
FIG. 5 is an inclined section taken generally on line 5—5 of FIG. 3 and illustrating the movable blade mountings.
Figure 4:
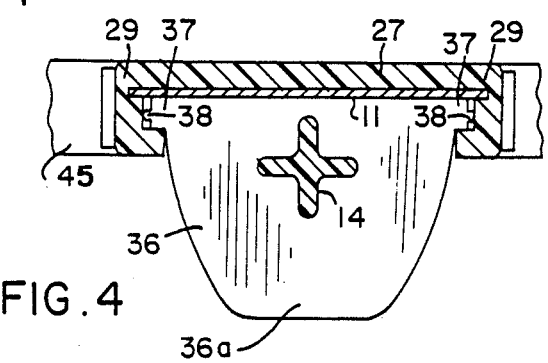
FIG. 4 is a horizontal section taken generally on line 4—4 of FIG. 3.

As most clearly shown in FIGS. 3–5, the fixed blade 11 is a plate-like member which is secured within side channels 29 formed to the opposite sides on the inner most face of the support wall. As illustrated most clearly in FIGS. 3 and 4, the blade projects upwardly throughout the channel. The upper end of the blade and the channel are slightly tapered, as at 30 in FIG. 3, to secure the blade in fixed supported relation within the support.

The blade 11 is thus held against all normal forces and is firmly and reliably supported in the support.

The side edge of the cutting blade 11 is offset inwardly with a somewhat tapered edge. The edge is provided with a plurality of locking notches, shown as a pair of right triangular notches 31, mating with complementing projections within a side channel of the support. In assembly, the blade 11 is forced upwardly within the channel and the teeth move into locking engagement with the side edge of the channel to securely lock the unit in position.

The lower end of the flat edge 19 is spaced upwardly of the lower most end of the guide wall 9 which may be formed with a small curved enlargement 32. The flower stem 2 when inserted along the guide is lifted slightly to move the stem end 4 through the opening. The stem 4 is then appropriated located resting on the cutting edge 19 of the fixed blade 11. The cutting edge 17 of the movable blade 18 is above the stem and in position for cutting upon downward movement of the cutting blade, as shown in FIGS. 1 and 3.

The fixed blade 11 and the movable blade 18 are similarly formed of a suitable cold rolled stainless steel, preferably a 22 gauge type 304 stainless steel. The fixed blade is flat to define a sharp cutting edge, and is formed without burrs and the like.

The fixed blade 11 has a generally right triangular opening aligned with the flower stem opening in the vertical support wall, as shown in FIG. 3. The bottom edge of the right triangular opening is located in a horizontal plane and defines the bottom cutting edge 19 for cooperative cutting action with the guillotine blade unit 18.

The bottom cutting edge of the fixed blade 11 is shown as a flat edge surface corresponding to the thickness of the plate, as most clearly shown in FIG. 5. The edge opening of the fixed blade provides support for the stem as the sharp cutting edge severs the stems. The stems are thereby supported projecting through the opening in the path of the movable blade, which moves downwardly in a sharp-plane with the inclined structure providing a shear cutting of the stem as it moves across the opening of the fixed blade.

The movable blade unit 13 includes an L-shaped support with a flat blade support wall 35 abutting the fixed blade 11 and an upper horizontal wall 36 projecting laterally away from the fixed blade support wall. The stem 14 is secured to the horizontal wall and projects upwardly through the cover 7.

As most clearly illustrated in FIGS. 4 and 5, the stem and support plate are integrally formed with a lateral extending tab 36a which projects outwardly of the horizontal wall 36 and stem 14. The tab 36a extends across the width of the support plate and defines a means for the user to safely hold the movable sharp blade unit with his fingers during replacement. The user may thus assemble the movable blade unit 13 with the stem 14 projecting upwardly into the spring loading chamber without handling the sharp knife edge portion. The blade 18 is staked or otherwise permanently fixed to the support plate. This eliminates the hazard associated with attempting to replace the razor-sharp knife blade as a separate element on the movable support. The support unit is readily formed as a molded member with the knife appropriately staked thereto to provide an inexpensive and readily replaceable knife unit.

As most clearly shown in FIGS. 3–5, the wall 35 is slidably supported within the channel portion 29 of the fixed blade support wall 27 which projects outwardly from the fixed cutting blade. The movable support wall 35 is generally a rectangular member having small guide projections 37 mating with and sliding in the channels in the fixed blade support wall. The projections 37 are provided with small semi-circular edge portions abutting the inner walls of the guide channels to provide a low friction support for the movable blade support. The wall 30 of the L-shaped support has its planar face abutting the fixed blade 11. The outer face of the support wall 35 is formed with an angulated end portion 39. The movable cutting guillotine blade 18 is secured abutting such angled surface and projects downwardly therefrom. The guillotine blade 18 is thereby supported in sliding engagement with the fixed blade. In the illustrated embodiment of the invention, the L-shaped support is formed of a suitable plastic material. The blade 18 is generally a rectangular blade having the ends tapered slightly to form a trapezoidal configuration with the cutting edge along the long edge of the structure. The inclined end portion 39 is correspondingly recessed such that the blade 18 is held rather firmly along the outer edge and the side edges in appropriate cutting location.

The blade 18 is formed with a pair of spaced openings aligned with the portion of the inclined surface. A pair of securement stakes 39a are integrally molded with the blade support wall 39. The blade is heat staked to the support in cutting position to firmly fix the blade to the movable support as an integrated part thereof as most clearly shown in FIGS. 3–5. Any other means of firmly securing the blade to the movable wall can of course be provided.

The movable blade 18 projects downwardly from the support portion 39 at a slight angle. The lower end of the blade is formed as a tapered conically shaped member terminating in the sharp cutting edge 17. The angular face of the cutting edge 17 and the angular relation of the mounting wall are constructed such that the sharp cutting edge 17 of the movable blade 18 is located in sliding abutting engagement with the sliding face of the fixed blade 11. The sliding faces of the fixed blade and the movable blade are formed as flat and smooth surfaces. The wall 35 of the movable cutting blade unit 13 also has a smooth, sliding surface engaging blade 11. As the movable support is pushed downwardly and moves across the fixed blade opening, the cutting edge 17 moves past the horizontal cutting edge 19 of the fixed blade 11, and provides a smooth, sharp and clean severing of the stem end 4.

The movable blade 18 is thus inclined to the flat edge surface of the fixed blade. The blade 18 is preferably formed of high quality stainless steel having the tapered cutting edge 17. The cutting edge 17 is sharpened on only the one side to be razor-sharp and maintains its edge for many cuts. The dimensional relationship is selected with the outermost edge of the movable blade slightly offset with respect to the plane of the fixed blade 11 such that in the assembled relation, the movable blade 18 bears on the flat face of the fixed blade 11 with some pressure. As the blade 18 moves past the opening and particularly across the cutting edge 19 of the fixed blade, the pressure engagement establishes a smooth movement across the opening and particularly movement across the cutting edge of the fixed blade. The proper construction of the blades provide a highly smooth, high quality cutting action. This promotes and establishes shearing cutting of the flower stem without crimping, brusing or mashing of the stems and which avoids any noticeable disruption and tearing of the cut end of the flower stem. This invention thus provides an optimum severing of the flower stem, maintaining the opening of the passageways for optimum movement of water into the tubular openings or passageways.

The horizontal support wall 36 in the uppermost position of the movable cutting blade unit 13 abuts the underside of the cover 7.

In the illustrated embodiments, the cover 7 is thus formed with a cap receiving recess 40 generally in alignment with the stem opening. As shown in FIGS. 2 and 3, recess 40 is generally a rectangular opening of a width corresponding to that of the stem opening 8 and of a somewhat greater length. A tubular guide 41 is integrally formed with and projects upwardly within the cap receiving recess 40 in the cover. The tubular guide 41 defines a guide for receiving the movable support stem 14 which projects upwardly through and out of the guide. The opening of the guide at the base of the cover essentially corresponds to the maximum width of the stem, which is preferably in a cruciform configuration to provide minimal frictionally engagement as well as provide a light weight support. The guide projecting upwardly from the base has a somewhat enlarged inner diameter, and forms a space about the stem. Coil spring 16 is located within the guide surrounding the stem.

The cap 15 is shown as an inverted cup-shaped member having a central, hub 42 adapted to mate and telescope within the cover 7. The outer periphery of the cap is correspondingly shaped with and projects downwardly into the cover recess. The cap 15 has a generally exterior rectangular configuration and correspondingly closely mates with the outer opening or recess 40. The corresponding aligned portion of the movable flower stem 14 has a reduced diameter and projects upwardly into the cap hub 42 and forms a firm frictional interengagement therewith stem. The spring 16 acts between the base of the guide 41 and the cap hub 42. The spring holds the movable blade assembly raised, with the outer portion of the cap spaced upwardly of the cover. The lower end of the cap in the outermost position projects slightly into the cover recess as shown in FIG. 5.

In operation, the operator merely presses downwardly on the exposed cap to move the movable blade assembly through the cutting motion and providing prompt and effective cutting of a flower stem located in the blade opening.

Figure 6:
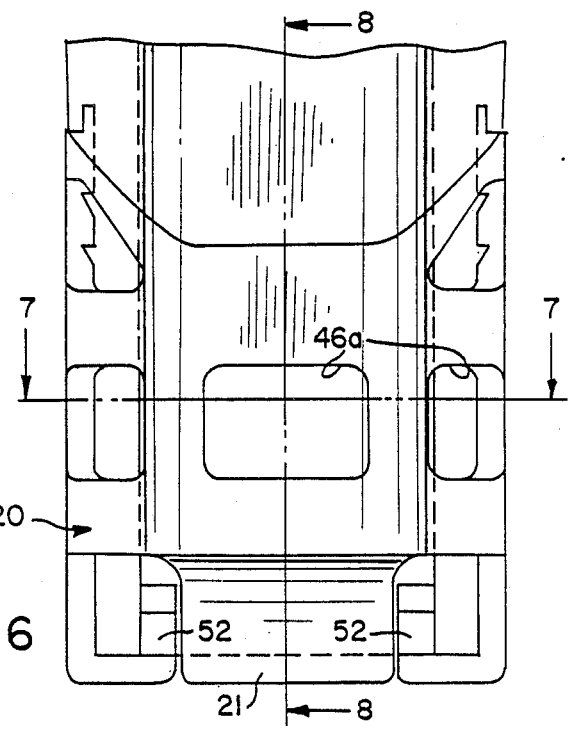
FIG. 6 is an enlarged fragmentary elevational view taken generally on line 6—6 of FIG. 1.
Figure 7:
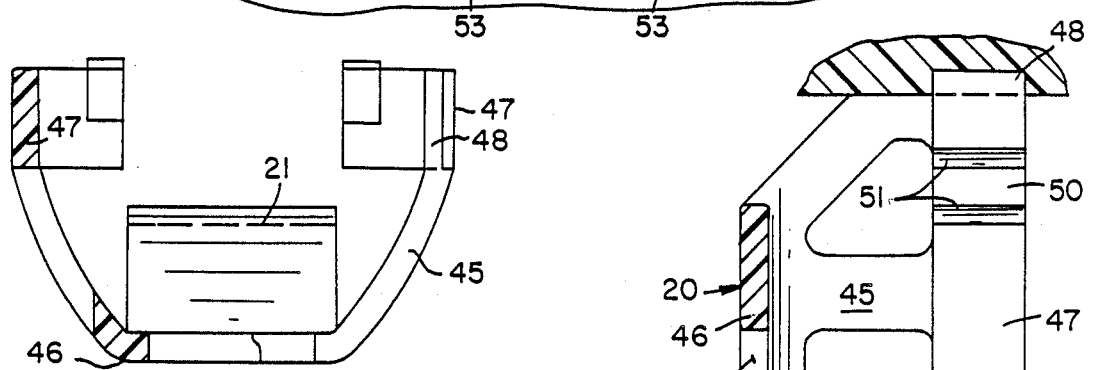
FIG. 7 is a horizontal section taken generally on line 7—7 of FIG. 6.
Figure 8:
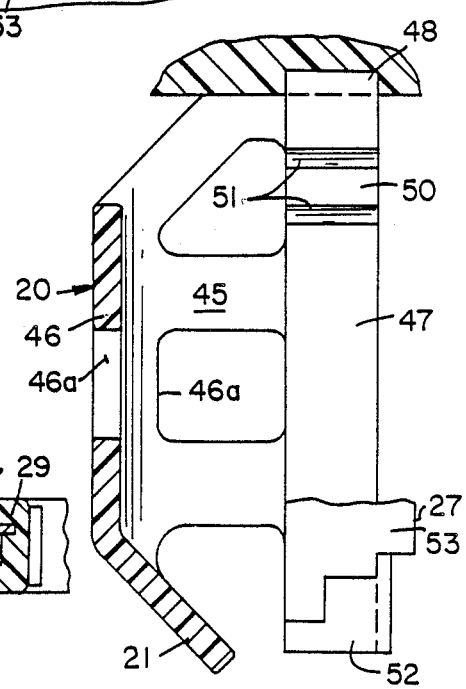
FIG. 8 is a vertical section taken generally on line 8—8 of FIG. 6.

The plastic guard 20 is located adjacent the bottom wall of the cover 7 and releasably secured to the fixed blade support wall 27 to form an integrated part thereof overlying the movable blade mechanism. As shown in FIGS. 6–8, the guard 20 is generally a shallow U-shaped member extending downwardly immediately beneath the bottom wall of the cover 7. The guard 20 is an encircling protective wall which includes a pair of sidewalls 45 and a central base wall 46 spaced outwardly of the movable blade. The base wall 46 is a flat member which projects downwardly from the cap and terminates at the lower end in the inwardly inclined lip 21 which projects inwardly generally between the two lower projections on the side walls. The base wall 46 and sidewalls 45 of the guard have an opening 46a generally aligned with the opening of the fixed blade. The guard is preferably a single-piece, integral molded plastic member.

More particularly, the sidewalls 46 of the guard, as most clearly shown in FIGS. 6 through 8, is formed with side mounting flanges 47 having projections 48 which project upwardly from a upper most reference edge of the guard. The projections mate with corresponding recesses in the base of the cover, as shown in FIGS. 3 and 8, and locate the guard with respect to the movable blade unit 13 and the fixed blade 11.

The guard 20 is releasably clamped to the fixed blade support. Thus, the unit is preferably and conveniently formed of a suitable plastic having the side mounting flanges 47 flexibly interconnected to the encircling protective body 45-46. The guard flanges are readily deflected outwardly to secure the side walls 48 of the support to the fixed wall support 27 with the inclined locking projections 48 adjacent the upper ends. The lower guard end includes the offset leg which protrude inwardly and lock into the lower end of the support. The removable guard allows convenient access to the blade unit for replacement of the blade unit as the unit while maintaining appropriate enclosure about the sharp edge of the blade during operation.

The projection and notches locate the sidewalls and base wall in outwardly spaced relation to the blade structure and generally form a wall in alignment with the outer edge of the horizontal wall of the movable blade support which further serves to appropriate support and the movable guide unit within the cutting motion. The plurality of spaced openings in the side and base walls permit free flow of the liquid throughout the unit. The lower most end of the sidewalls immediately adjacent and alignment with the notch connection are provided with inwardly projecting stepped portions which extend inwardly to approximately the alignment with the outer base wall.

The base wall has a generally flat planar portion aligned with the cutting blade and particularly the cutting blade opening and projects downwardly over the depending fixed blade support. The guard thus provides an essential enclosure about the blade structure.

The integral mounting sidewall portions 50 of the guard are also generally flat walls spaced to slide over one outer sides of the side channels 29 of the fixed blade support 27. The inner face of the wall portions 50 include a pair of spaced recesses 51. Each recess 51 is generally a right triangular inclined surface. The sidewalls telescope upwardly over a corresponding sidewall projection on the channel walls 29 of the cover to provide a stable interconnection of the guard to the wall structure.

The lower end of the sidewall portions 50 are molded with interconnecting steppe-d walls 53 mating with corresponding projections on the blade support to permit the adhesive or welding of the member into a fixed supporting structure.

Generally, the fixed blade has an indefinite life and is permanently supported within the unit. The movable blade with the sharp cutting edge has a finite operating life for the desired smooth, clean severing of the stem. In a practical application, a movable blade of stainless steel will have a life of about 700 cuts. The movable blade 18 is formed as an integrated part of the blade unit which is replaced by finger gripping of the extended tab. This then requires a minimum of maintenance and permits safe replacement of the blade unit in the cap.

With the cover 7 disassembled from the jar, the guard 20 provides a protective enclosure about the knife structure, minimizing the possibility of any accidental engagement with the knife edges. Further, in the illustrated embodiment of the invention, the guard lip 21 further confines the location of the stem within the openings and accurately locates it for optimum severing. To replace the movable blade unit 13, the user deflects the guard sidewalls or flanges 47 and removes the guard. The cap is removed and the user holds the movable blade unit by the finger tab to remove the old unit and insert a new unit.

Although shown with a single flower in position, obviously one or more might be inserted into the flower cutter.

The flower stem cutter constructed with a small four inch jar or decanter permits the cutting of one or more stems. In a structure incorporating the invention as illustrated in the drawings, the fixed blade has an opening of approximately 7/16 inches. The jar was formed with a nominal diameter of about 5 inches and a depth of about 4 inches. The device was used to cut up to 36 flower stems in a single pass with the manual manipulation and depression of the sharp movable blade.

It is desirable however to minimize the number of flowers cut at any one time and generally it is not recommended to cut more than a couple of stems at any given time for optimum results.

The present invention thus provides a significant improvement in the construction of a small compact flower cutter particularly useful for the cutting of individual or a couple of flower stems while maintaining of the flower stems within the bath of protective liquid. The cutting structure provides optimum and effective cutting structure while the guard maintains optimum safety considerations for use by the individual and the like.

Various modes of carrying out the invention are contemplated as being within the scope of the following claims particularly pointing out and distinctly claiming the subject matter which is regarded as the invention.

I claim:

1. A flower stem cutter for severing of the outer end of an individual flower, comprising a manually portable container, a cover releasably attached to the upper end of said container, said cover being a generally cup-shaped member having a rim releasably secured to said container with the inner edge of the cover abutting said rim and having an upper curved enclosure wall projecting upwardly of the end of said container, said cover including a diametric tubular slot projecting inwardly from one side of the cover across about one-half the diameter of the cover and the container, a guide member projecting inwardly and downwardly into said container, said guide member terminating in a vertical fixed blade support wall, a flat cutting blade secured to said support wall, said support wall and blade including an opening generally aligned with each other and the guide member, a lower edge of said fixed blade opening defining a flat cutting surface, a movable blade unit having a supporting stem extending through said cover and having a horizontal wall and a vertical blade support abutting said fixed blade, a guillotine blade secured to the ax inner face of said vertical blade support and being secured in angular relationship thereto, said movable guillotine balde extending from said wall and terminating in a pointed inner end, said pointed inner end having a surface abutting the fixed blade and locating the cutting edge of said movable blade in sliding abutting engagement with said fixed blade, means coupled to said stem and resiliently supporting said movable blade in a raised position with said cutting edge of said movable balde located immediately above said fixed blade opening and said fixed blade, said stem being movable inwardly against said resilient means to move said movable blade downwardly across said opening and past said flat cutting surface of said fixed blade, a generally U-shaped guard, said guard having side walls projecting downwardly from the opposite sides of said horizontal wall to enclose the movable blade, said side walls projecting outwardly of said support wall, an outer base wall secured to said sidewalls and generally aligned with said movable blade, said outer base wall having a bottom lip extending inwardly toward said support wall, said lip being a solid wall member generally aligned with an extension of the path of said tubular guide opening and defining a stop wall engaged by the stem for locating of the stem with respect to said cutting blade.

2. In a flowed stem cutting apparatus including a hand portable container for confining of a protective liquid bath sufficient to cover the lower end of a flower stem projecting into the container beyond a blade assembly including a fixed blade unit having a fixed blade and including a movable blade unit mounted to move across the fixed blade and located within the liquid bath, the improvement in a support structure for the blade assembly comprising, a fixed blade support in the container for the fixed blade unit and including an enclosing wall about the fixed blade u nit, a movable support for said movable blade unit movably secured abutting said fixed blade support, and a guard unit secured to said fixed blade support and extending outwardly from said fixed blade support and said enclosing wall unit and having an encircling portion aligned with the movable blade unit and located in outwardly laterally spaced relation thereto and with said wall unit establishing a protective enclosure extending essentially completely bout the blade assembly.

3. In a flower stem cutting apparatus including a hand portable container for confining a protective liquid bath sufficient to cover the lower end of a flower stem projecting into the container beyond a blade assembly including a fixed blade unit having a fixed blade and including a movable blade unit mounted to move across the fixed blade and located within the liquid bath, the improvement in a support structure for the blade assembly comprising, a fixed blade support in the container for the fixed blade unit, a movable support for said movable blade unit movably secured abutting said fixed blade support, and a guard unit secured to said fixed blade support and extending outwardly from said fixed blade support and having an encircling portion aligned with the movable blade unit and located in outwardly laterally spaced relation thereto to establish a protective enclosure about the blade assembly, said guard unit extends downwardly over said movable blade unit and includes a bottom wall portion and projecting laterally toward the fixed blade support to maintain a significant enclosure about said fixed blade and said movable blade.

4. The flower stem cutting apparatus of claim 3 including a releasable top cover means releasably secured to the container, said fixed blade support being firmly secured to said cover means, said movable blade unit being slidably fixed to said fixed blade support and having an external operator extending through said cover means.

5. The flower stem cutting apparatus of claim 3 wherein said fixed blade unit includes a fixed blade secured to said blade support unit, said guard unit including an outer flat wall generally aligned with said blade unit and having a bottom inclined lip defining said bottom wall projecting inwardly toward said support and terminating in slightly spaced relation to said support.

6. The stem cutting apparatus of claim 5 wherein said guard unit includes sidewalls secured to said flat wall and extending outwardly and inwardly to said fixed blade support, and means securing said sidewalls to said fixed blade support.

7. A flower stem cutter for severing of the outer end of an individual flower, comprising a manually portable container, a cover releasably attached to the upper end of said container, said cover including a diametric slot projecting inwardly from one side of the cover across about one-half the diameter of the cover and the container, a guide means projecting inwardly and downwardly into said container, a fixed blade unit including a fixed flat cutting blade mounted within the container and including an opening generally aligned with said guide means, the lower edge of said opening defining cutting edge, a movable blade unit having a support element slidably mounted to said cover and having a movable vertical guillotine cutting blade abutting the face of said fixed blade, means coupled to said blade support element and resiliently supporting said blade support element and resiliently supporting said movable blade in a raised position with said cutting edge of said movable balde located above said cutting edge of said opening, and a generally U-shaped guard secured to said fixed blade unit and surrounding said movable blade to enclose the cutting blades.

8. The flower stem cutter of claim 7 wherein said diametric slot projects inwardly from one side of the cover across about one-half the diameter of the cover and the container, and said cover having side openings for introducing and removal of liquid.

9. The flower stem cutter of claim 7 wherein said movable blade is a flat metal member secured in angular relationship to the fixed blade, said movable blade terminating in a pointed inner end, said pointed inner end having a surface abutting the fixed blade and locating the cutting edge of said movable blade in sliding abutting engagement with said fixed knife.

10. The flower stem cutter of claim 7 wherein said guard is secured to said cover and to said fixed blade unit, said guard including a base wall and sidewalls and generally aligned with said movable blade, said base wall having a bottom lip extending inwardly toward said support element, said lip being a solid wall member generally aligned with an extension of the path from said guide means and defining a stopwall engaged by the stem for locating of the stem with respect to said cutting blade.

11. The flower stem cutter of claim 7 wherein said guard includes a solid wall member generally aligned with an extension of the path from said guide means and defining a stop wall engaged by the stem for locating of the stem with respect to said cutting blade.

12. The flower stem cutting apparatus of claim 7 wherein said fixed blade unit includes a blade support unit secured to said cover, said guard includes an outer flat wall generally aligned with said fixed blade unit and having a bottom inclined lip defining a bottom wall projecting inwardly toward said support and terminating in slightly spaced relation to said support.

13. The stem cutting apparatus of claim 12 wherein said guard includes sidewalls secured to said flat wall and extending outwardly and inwardly to said fixed blade support, and means securing said sidewalls to said fixed blade support.

14. A flower stem cutting apparatus including a hand portable container for confining of a protective liquid bath sufficient to cover the lower end of a flower stem projecting into the container beyond a severing point and wherein a guillotine blade unit is movably mounted to the upper end of the container and located within the liquid bath, the improvement in a support structure for the guillotine blade unit, comprising a fixed blade support forming a part of a cover and projecting downwardly into the container, said guillotine blade unit being movable secured abutting said fixed blade support, a guard member releasably secured to said support and having a portion aligned with the blade unit and located in outwardly laterally spaced relation thereto, said guard unit extending downwardly over said guillotine blade unit and includes a bottom wall portion projecting laterally toward the blade support unit to maintain a significant enclosure about said fixed blade and said movable blade.

15. The flower stem cutter unit of claim 14 wherein said cutting blade unit includes a fixed blade secured to said blade support unit, said guard including an outer flat wall generally aligned with said blade unit and having a bottom inclined lip defining a bottom wall projecting inwardly toward said support and terminating in slightly spaced relation to said support, said guard including sidewalls secured to said flat wall and extending outwardly and inwardly to said blade support, and means securing said sidewalls to said blade support.

* * * * *

UNITED STATES PATENT AND TRADEMARK OFFICE
CERTIFICATE OF CORRECTION

PATENT NO. : 4,928,424

DATED : May 29, 1990

INVENTOR(S) : ANTHONY S. CAMPANELLI ET AL

It is certified that error appears in the above-identified patent and that said Letters Patent is hereby corrected as shown below:

Col. 1, line 50, Delete ""BVD-cut"" and substitute therefor ---"BUD-cut"---; Col. 11, Line 8, Claim 1, Delete " blade" and substitute therefor ---blade---; Col. 11, line 15, Claim 1, Delete "blade" and substitute therefor ---blade---; Col. 11, line 32, Claim 2, Delete "flowed" and substitute therefor ---flower---; Col. 11, Line 51, Claim 2, Delete "bout" and substitute therefor ---about---, Col. 12, Line 43, Claim 7, Delete "balde" and substitute therefor ---blade---.

Signed and Sealed this

Twenty-ninth Day of September, 1992

*Attest:*

DOUGLAS B. COMER

*Attesting Officer*      *Acting Commissioner of Patents and Trademarks*